United States Patent
Hong et al.

(10) Patent No.: US 11,908,248 B2
(45) Date of Patent: Feb. 20, 2024

(54) USER DRIVEN CINEMA CONSTRUCTOR AND FUNDING SYSTEM

(71) Applicants: Joon Hong, Torrance, CA (US); Ethan Joseph Griffith, North Hollywood, CA (US)

(72) Inventors: Joon Hong, Torrance, CA (US); Ethan Joseph Griffith, North Hollywood, CA (US)

(73) Assignee: Ethan Griffith, Burbank, CA (US)

( * ) Notice: Subject to any disclaimer, the term of this patent is extended or adjusted under 35 U.S.C. 154(b) by 856 days.

(21) Appl. No.: 14/737,046

(22) Filed: Jun. 11, 2015

(65) Prior Publication Data

US 2016/0364931 A1    Dec. 15, 2016

(51) Int. Cl.
  *G07C 13/00*    (2006.01)
  *G06Q 99/00*    (2006.01)
  *G06Q 10/0635*  (2023.01)

(52) U.S. Cl.
  CPC ......... *G07C 13/00* (2013.01); *G06Q 10/0635* (2013.01); *G06Q 99/00* (2013.01)

(58) Field of Classification Search
  CPC .......... G06Q 10/00–50/00; G07C 1/00–15/00
  USPC ................................................. 705/7.11–7.42
  See application file for complete search history.

(56) References Cited

U.S. PATENT DOCUMENTS

| | | | | |
|---|---|---|---|---|
| 2001/0032157 A1 * | 10/2001 | Dannenberg | ........... | G06Q 40/06 705/36 R |
| 2002/0056110 A1 * | 5/2002 | Rodrigue | ............... | G06Q 30/02 725/60 |
| 2002/0082900 A1 * | 6/2002 | Johnson | ............. | G06Q 30/0201 705/7.29 |
| 2003/0004803 A1 * | 1/2003 | Glover | ............... | G06Q 30/0235 705/14.18 |
| 2003/0037144 A1 * | 2/2003 | Pestoni | ................. | H04L 67/566 709/226 |
| 2003/0195795 A1 * | 10/2003 | Chacker | ................. | G06Q 30/02 705/7.29 |
| 2004/0143481 A1 * | 7/2004 | Li | ........................ | G06Q 10/101 705/7.32 |
| 2008/0046953 A1 * | 2/2008 | Kossila | ............. | H04N 21/2543 725/132 |
| 2009/0239205 A1 * | 9/2009 | Morgia | .................... | G09B 7/00 434/362 |
| 2010/0106634 A1 * | 4/2010 | Atureliya | ............. | G06Q 10/103 705/35 |

(Continued)

*Primary Examiner* — Alan S Miller

(57) ABSTRACT

A method of constructing and creating a proposed cinema selection may receive, from a plurality of users, selected cinema elements to create a plurality of proposed cinema selections and store, in a memory, the plurality of proposed cinema selections along with corresponding selected cinema elements. The method may also include displaying one of the plurality of proposed cinema selections along with a plurality of the selected cinema elements, receiving voting authorization for a user that a payment has been received to allow voting for one of a plurality of proposed cinema selections; and receiving at least one voting value identifying which of the plurality of proposed cinema selections has been voted on by at least one user. The method also include aggregating the voting values received for proposed cinema selections; and displaying a list of the proposed cinema selections having a highest ranking based on the voting values.

18 Claims, 37 Drawing Sheets

(56) References Cited

U.S. PATENT DOCUMENTS

| | | | |
|---|---|---|---|
| 2012/0197684 A1* | 8/2012 | Storey | G06Q 30/0203 |
| | | | 705/36 R |
| 2013/0226688 A1* | 8/2013 | Harvilicz | G06Q 30/02 |
| | | | 705/26.8 |
| 2014/0162241 A1* | 6/2014 | Morgia | G06Q 50/10 |
| | | | 434/362 |
| 2014/0172505 A1* | 6/2014 | Dekhtyaruk | G06Q 30/0282 |
| | | | 705/7.32 |
| 2014/0194209 A1* | 7/2014 | Ziouvelou | A63F 13/12 |
| | | | 463/42 |
| 2016/0140789 A1* | 5/2016 | Wickersham, III | H04W 4/021 |
| | | | 705/12 |
| 2017/0124500 A1* | 5/2017 | Shen | G06Q 10/06313 |

* cited by examiner

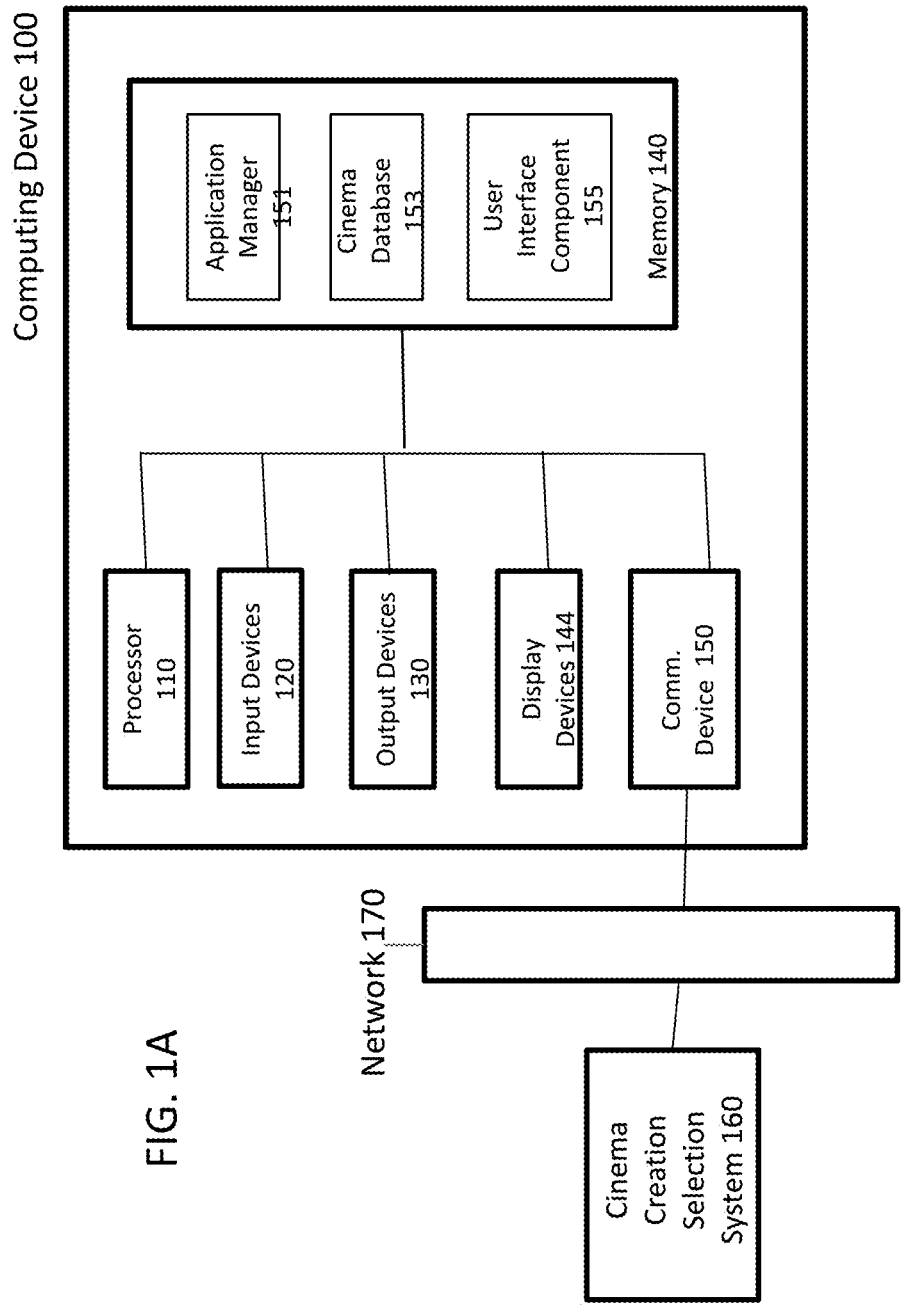

First... What should the genre be?

- Drama
- Action
- Adventure
- Comedy
- Sci Fi
- Fantasy
- Epic

- Mystery
- Horror
- Thriller
- Musical
- Romance
- Family
- Western

Building the team...

Director  Paul Verhoven

Male Lead  Harrison Ford

Female Lead

Co Star  Benedict Cumberbach   Co Star  Sam Rockwell

Production Design (The look of the film)

The Musical Score  John Scott

FIG. 3B

Theme (The Message)

- Gaining/losing power
- Change vs. Tradition
- Ends do or don't justify means
- Chaos and Order
- Revenge
- Redemption
- Circle of Life
- Darkness and Light
- Freedom vs. Oppression
- Discrimination
- Fate or Free will
- Class System Vs. Equality
- Conquering fear
- Sacrifice
- Man Vs. Nature
- Materialism as downfall
- Idealism Vs. Corruption
- Self-Awareness
- Man Vs. Technology
- Temptation
- Will Power Vs. Struggles
- Standing up for yourself

FIG. 3C

Select the tone below

- Quirky
- Campy
- Serious
- Intense
- Playful/ light
- Bitter
- Tragic
- Tongue and Cheek
- Soulful
- Deep /Introspective
- Joyful
- Dark/ Melancholy
- Whimsical
- Eerie/Scary

FIG. 3D

The setting!

- Time period
- Time of Year
- Location
- The Arena

FIG. 3E

The type of film you want

- Live Action (Real life people)
- Computer Animation CGI
- Traditional Animation
- Puppets
- Clay Animation

FIG. 3F

Enter your 10 Script Elements

_Propaganda_
_Complexity_
_Fog_
_Aircraft_
_____

FIG. 3G

Setting Choices / Elements

- Cities
- Parks
- Building
- Streets
- Countries

- Planets
- Indoor/Outdoor
- Beach
- Underwater

FIG. 3H

Drama? Great!

Next, when you finish building the elements of your film, the choices you make will further specify your genre. Below are examples of the subgenres that dramas often fall under.

- Coming of Age Drama
- Political Drama
- Drama Comedy
- Melodrama
- Western Drama
- Crime Drama
- Spy Drama
- Tragedy
- Sports Drama
- Racial Drama
- Life story Drama
- Mystery Drama
- Social Drama
- Childhood Drama
- Road Movie Drama

FIG. 4A

Action? Great!

Next, when you finish building the elements of your film, the choices you make will further specify your genre. Below are examples of the subgenres that action films often fall under.

- Action Buddy film
- Action Quest
- Action Comedy
- Martial arts action
- Swashbuckler Action
- Crime Action
- Crime Caper Action

- Mega Violent Action
- Action Horror
- Action Chase film
- Action Mystery
- Spy Action
- Journey Action
- Action Adventure

FIG. 4B

Adventure? Great!

Next, when you finish building the elements of your film, the choices you make will further specify your genre. Below are examples of the subgenres that adventure films often fall under.

- Action Adventure
- Adventure Quest
- Adventure Comedy
- Martial arts adventure
- Swashbuckler Adventure
- World Adventure

- Space and/or time Adventure
- Action Mystery
- Spy Adventure
- Journey/ Road Adventure
- Kid Adventure

FIG. 4C

Comedy? Great!

Next, when you finish building the elements of your film, the choices you make will further specify your genre. Below are examples of the subgenres that comedies often fall under.

- Horror Comedy
- Action Comedy
- Romantic Comedy
- Spy Comedy
- Coming of Age Comedy
- Fish out of water Comedy
- Black Comedy
- Crime Caper Comedy
- Parody
- Teen Comedy
- Political Comedy
- Road/ Journey Comedy
- Western Comedy
- Goofy/Dumb Comedy
- Character Comedy

FIG. 4D

Sci Fi? Great!

Next, when you finish building the elements of your film, the choices you make will further specify your genre. Below are examples of the subgenres that Sci Fi films often fall under.

- Sci Fi Comedy
- Sci Fi Action/Adventure
- Sci Fi Thriller
- Punk Sci Fi
- Western Sci Fi
- Time Travel Sci Fi
- Apocalyptic Sci Fi
- Post-Apocalyptic Sci Fi
- Pulp Sci Fi

- Sci Fi Parody
- Sci Fi Quest
- Hard Science Sci Fi
- Voyage Sci Fi
- Realistic Sci Fi
- Creature/Monster Sci Fi
- Alternate timeline/ Parallel world
- Aliens/ Other worlds

FIG. 4E

Fantasy? Great!

Next, when you finish building the elements of your film, the choices you make will further specify your genre. Below are examples of the subgenres that fantasy films often fall under.

- Fantasy Comedy
- Action Fantasy
- Fantasy Thriller
- Fantasy Adventure
- Western Fantasy
- Fantasy Creatures and Monsters

- Fantasy Parody
- Fantasy Quest
- Fairy Tale
- Medieval Fantasy
- Paranormal
- High/Mythic Fantasy

FIG. 4F

Musical? Great!

Next, when you finish building the elements of your film, the choices you make will further specify your genre. Below are examples of the subgenres that musicals often fall under.

- Dance Musical
- Romantic Musical
- Musical Drama
- Musical Comedy
- Family Musical
- Adventure Musical

FIG. 4G

Romance? Great!

Next, when you finish building the elements of your film, the choices you make will further specify your genre. Below are examples of the subgenres that romance films often fall under.

- Romantic Comedy
- Romantic Tragedy
- Romantic Drama
- First Love Romance
- Road Movie Romance
- Romantic Mystery

FIG. 4H

Family Film? Great!

Next, when you finish building the elements of your film, the choices you make will further specify your genre. Below are examples of the subgenres that family films often fall under.

- Family Friendly Adventure
- Family Comedy
- Family Vacation Film
- Family Swashbuckler
- Family Mystery Film

FIG. 4I

Western? Great!

Next, when you finish building the elements of your film, the choices you make will further specify your genre. Below are examples of the subgenres that westerns often fall under.

- Western buddy film
- Western Quest
- Western Comedy
- Martial arts Western
- Space Western
- Western Parody
- Revisionist Western
- Classic Western
- Spaghetti Style

- Western Horror
- Mystery Western
- Western Journey
- Western Drama
- Sci Fi Western
- Singing Cowboy Western
- Noir Western

FIG. 4J

Horror? Great!

Next, when you finish building the elements of your film, the choices you make will further specify your genre. Below are examples of the subgenres that horror films often fall under.

- B-Movie Horror
- Classic Horror
- Creature Features
- Devil/Demonic Possession
- Ghosts Horror
- Halloween Related Horror
- Psychological Horror
- Phobia Horror
- Horror Romance
- Splatter and Gore Horror

- Horror Comedy
- Horror Romance
- Horror Action
- Slasher Horror
- Paranormal Horror
- Witchcraft/Occult Horror
- Creepy Child Horror
- Body/Transformation Horror
- Natural Horror
- Sci Fi Horror

FIG. 4K

Mystery? Great!

Next, when you finish building the elements of your film, the choices you make will further specify your genre. Below are examples of the subgenres that comedies often fall under.

- Dark Thriller Mystery
- Amateur Detective
- Child in Peril
- Espionage
- Classic Who dun it
- Bumbling Detective
- Private Detective Mystery
- Inverted/ How done it Mystery
- Psychological Suspense Mystery
- Heists and Capers Mystery
- Hardboiled detective
- Handicapped Detective
- Romantic Mystery
- Young Adult Mystery
- Medical Mystery
- Cozy/Small town Mystery

FIG. 4L

Epic? Great!

Next, when you finish building the elements of your film, the choices you make will further specify your genre. Below are examples of the subgenres that epics often fall under.

- Western Epic
- Religious Epic
- Fantasy Epic
- Action Epic
- Adventure Epic
- Romance Epic
- Epic Drama

FIG. 4M

My Concept One Page

Ranking at 23%

R Rated Sci Fi Action Adventure

Starring Harrison Ford and Miranda Cosgrove (By Proxy)

Also starring Benedict Cumberbatch and Sam Rockwell

A live Action film, Directed by Paul Verhoeven

Music by John Scott

Production Design Richard Hudolin (By Proxy)

Theme: Conquering Fear

Tone: Playful/Light

Setting: During fall of the near future, in the Austrian Alps, in the world of Science and Technology Make it happen! Vote for this!       Keep it as a poll

Fig. 5

The current top ten concepts

| | Concept | % Funded |
|---|---|---|
| #1 | Tom Cruise / Scarlett Johansson  Thriller | 43% |
| #2 | Harrison Ford/Miranda Cosgrove  Sci Fi Action Adventure | 23% |
| #3 | Lee Pace / Mary Louise Parker  Thriller | 17% |
| #4 | Bruce Willis / Emma Stone  Crime Drama | 6% |
| #5 | Idris Elba / Kerry Washington  Western | 4% |
| #6 | Jackie Chan / Megan Fox  Martial Arts Action | 2.4% |
| #7 | Michael Fassbender / Cameron Diaz  Romantic Comedy | 2% |
| #8 | Chris Evans / Aubrey Plaza  Spy Comedy | 1.3% |
| #9 | Bill Murray / Meryl Streep  Horror Comedy | 0.9% |
| #10 | George Clooney / Marissa Tomei  Medical Mystery | 0.4% |

The percentages represent the amount of the total funding goal that has been raised so far for each published movie concept

Fig. 6

Vote Official $10 USD

Remember, this vote WILL NOT greenlight a production without notifying you for approval within 7 days prior to America's choice studios using this ticket to start production. You will have the option to refund your ticket within that time. Without your response, the leading concept which is at least 80% of what you want in your one page, will be put into production. Meaning, the funds from your ticket purchase will be used for that film that's 80% similar to your one page. If your one page is used, or one exactly like it, than that concept would be 100% of what you want. If your concept is quite different than the project greenlighting, you will also have the option to refund, OR keep your ticket fund, unused, with your one page concept, join it with another current leading project at that time, and keep it there whether that production is greenlighted or not.

We accept Visa, Mastercard and PayPal

This ticket is redeemable to watch your film at the theater during the exhibition period Login and Vote

Fig. 7

Cruise / Johansson One Page

Ranking at 43%

Thriller

Starring Tom Cruise and Scarlett Johansson

Also starring James Spader and Harry Connick Jr.

A live Action film, Directed by Steven SoderBergh

Music by Danny Elfman

Production Design Richard Hudolin (By Proxy)

Theme: Chaos and Order

Tone: Serious

Setting: During Winter of the 1980's, in New York City, in the world of The Rich and Powerful Add My Vote for this!   Not my cup of tea

FIG. 8

Top Ranking Words

The most voted words from all voters will make up the words put in the film

- Peanuts
- Fog
- Acid
- Car-chase
- Air-fight
- Talking-Dog
- Drones
- Robot
- Rocket-Boots
- Farting

FIG. 9

Top Ten Directors

| | Directors | In % of Concepts |
|---|---|---|
| #1 | Christopher Nolan | 44% |
| #2 | James Cameron | 22% |
| #3 | Tim Burton | 9% |
| #4 | Guy Ritchie | 3.8% |
| #5 | Joss Whedon | 3.5% |
| #6 | Judd Apatow | 2.8% |
| #7 | Michael Mann | 2.7% |
| #8 | Bryan Singer | 2% |
| #9 | Martin Scorsese | 2% |
| #10 | David Fincher | 1.8% |

The percentages represent the relative frequency the cinema selection element choice appear in all published and unpublished movie concepts

FIG. 10B

Top Five Polled Genres

| Genres | In % of Concepts |
|---|---|
| Sci Fi Adventure | 23% |
| Crime Drama | 21% |
| Romantic Comedy | 13% |
| Mega Violent Action | 9% |
| Horror Comedy | 5% |

The percentages represent the relative frequency the cinema selection element choice appear in all published and unpublished movie concepts

FIG. 10C

Top Five Polled Themes

| Themes | In % of Concepts |
|---|---|
| • Class System Vs. Equality | 37% |
| • Revenge | 32% |
| • Idealism Vs. Corruption | 15% |
| • Freedom vs. Oppression | 8% |
| • Discrimination | 7% |

The percentages represent the relative frequency the cinema selection element choice appear in all published and unpublished movie concepts

FIG. 10D

Top Five Setting Choices

Setting — In % of Concepts

- Career in the big city — 52%
- The world of performers/artists — 49%
- The rich and powerful — 33%
- The weird and strange fringes of society — 27%
- World of super powers — 1%

The percentages represent the relative frequency the cinema selection element choice appear in all published and unpublished movie concepts

FIG. 11A

Movie Similarity Matrix

| | User 1 | User 2 | User 3 | User 4 | User 5 | User 6 | User 7 | User 8 | User 9 | User 10 |
|---|---|---|---|---|---|---|---|---|---|---|
| User 1 | 100.00% | | | | | | | | | |
| User 2 | 5.88% | 100.00% | | | | | | | | |
| User 3 | 5.88% | 0.00% | 100.00% | | | | | | | |
| User 4 | 0.00% | 5.88% | 0.00% | 100.00% | | | | | | |
| User 5 | 11.76% | 0.00% | 0.00% | 0.00% | 100.00% | | | | | |
| User 6 | 0.00% | 0.00% | 0.00% | 0.00% | 5.88% | 100.00% | | | | |
| User 7 | 5.88% | 5.88% | 0.00% | 0.00% | 5.88% | 17.65% | 100.00% | | | |
| User 8 | 5.88% | 0.00% | 0.00% | 0.00% | 5.88% | 0.00% | 5.88% | 100.00% | | |
| User 9 | 5.88% | 0.00% | 5.88% | 5.88% | 5.88% | 5.88% | 5.88% | 5.88% | 100.00% | |
| User 10 | 0.00% | 5.88% | 5.88% | 0.00% | 5.88% | 11.76% | 0.00% | 5.88% | 11.76% | 100.00% |

User 1 would try to persuade user 5 to vote more similarly
User 6 would reach out to users 7 and 10 and try to persuade them to adjust their votes to match User 6's (and vice versa)

FIG. 11B

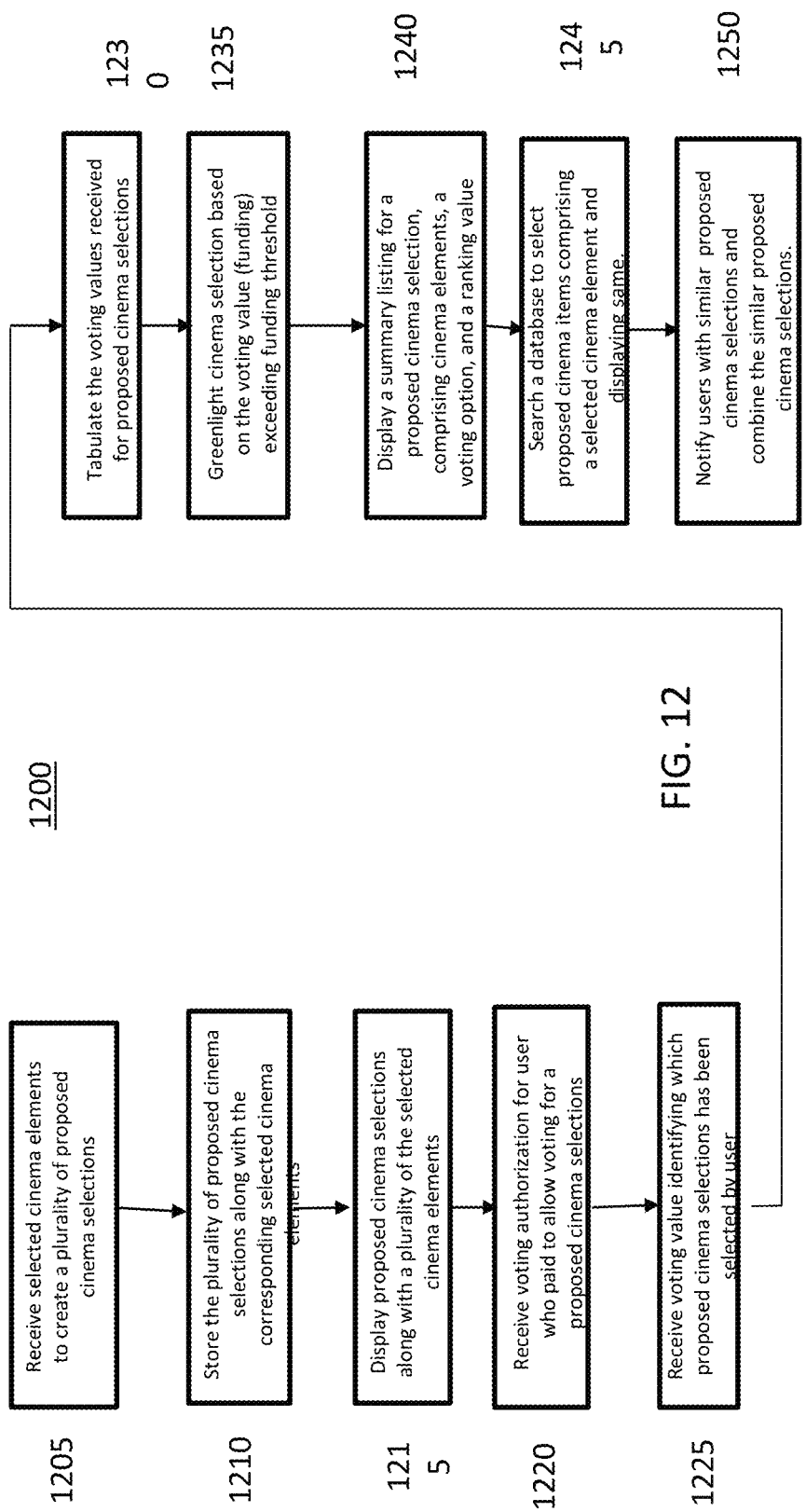

USER DRIVEN CINEMA CONSTRUCTOR AND FUNDING SYSTEM

BACKGROUND

1. Field

This invention relates generally to a system and method for creating, constructing, and/or selecting a crowdsourced, made-to-order, and crowdfunded movie.

2. Information/Background of Information

The system for creating and developing movies is in a state of flux. Many believe the movie industry is in a state of creative paralysis. The huge and inefficient budgets, with no guarantee of any return on investment, leads to large financial risks for movie studios and producers. This financial risk narrows future creative decisions regarding which films to greenlight and finance. Since sequels and remakes have a higher chance of success, the movie industry in many cases appears to be a monoculture of remakes and sequels that dominate the number of studio releases. Diversity in this art form is disappearing, and America's reputation as a center of quality and groundbreaking cinema is slipping away. The fear of financial failure of a film reduces the variety of cinema and threatens the sustainability of future major releases. Thus, what is needed is a system and method for allowing movie studios to create diverse cinema while minimizing financial risk for the movie creators.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may be best understood by reference to the following detailed description if read with the accompanying drawings in which:

FIG. 1A is an illustration of a system including a computing device, a network, and a cinema selection creation system;

FIG. 3B illustrates an example of a user interface to receive user input identifying or selecting a film creative team;

FIG. 3C illustrates an example of a user interface to receive input identifying a film's theme;

FIG. 3D illustrates an example of a user interface to receive input identifying a film's tone;

FIG. 3E illustrates an example of a user interface to receive input identifying a film's setting;

FIG. 3F illustrates an example of a user interface to receive input identifying a film type;

FIG. 3G illustrates an example of a user interface to receive input identifying script elements;

FIG. 3H illustrates an example of a user interface to receive input identifying locations of a proposed film;

FIG. 4A illustrates an example of a user interface to receive as input selections of drama subcategories;

FIG. 4B illustrates an example of a user interface to receive as input selections of action subcategories;

FIG. 4C illustrates an example of a user interface to receive as input selections of adventure subcategories;

FIG. 4D illustrates an example of a user interface to receive as input selections of comedy subcategories;

FIG. 4E illustrates an example of a user interface to receive as input selections of science fiction subcategories;

FIG. 4F illustrates an example of a user interface to receive as input selections of fantasy subcategories;

FIG. 4G illustrates an example of a user interface to receive as input selections of musical subcategories;

FIG. 4H illustrates an example of a user interface to receive as input selections of romance subcategories;

FIG. 4I illustrates an example of a user interface to receive as input selections of family subcategories;

FIG. 4J illustrates an example of a user interface to receive as input selection of western subcategories;

FIG. 4K illustrates an example of a user interface to receive as input selections of horror subcategories;

FIG. 4L illustrates an example of a user interface to receive as input selections of mystery subcategories;

FIG. 4M illustrates an example of a user interface to receive as input selections of epic subcategories;

FIG. 5 illustrates an illustrative one page for a proposed cinema selection with selected cinema elements according to an embodiment;

FIG. 6 illustrates an example of a user interface to display a voter ranking of proposed cinema selections according to an embodiment;

FIG. 7 illustrates an example of a user input screen identifying a process for voting, the rules of voting, and a cost of voting;

FIG. 8 illustrates an example of a user interface that displays a one-page with a percentage of votes according to an embodiment of the invention;

FIG. 9 illustrates an example of a user interface screen to display a polling of the top ten words in the cinema element selections in the crowd-funded cinema selection system;

FIG. 10B illustrates an example of a user interface to display the top ten polled directors;

FIG. 10C illustrates an example of a user interface to display the top ten polled genres in one pages;

FIG. 10D illustrates an example of a user interface to display the top ten polled themes in one pages;

FIG. 11A illustrates an example of a user interface to display which elements specific users and/or creators have selected for a plurality of element selections;

FIG. 11B illustrates an example of a user interface to display similarities in proposed movie concepts/selections to help users identify which users/creators have similar ideas and may be candidates to contact; and FIG. 12 is a flowchart illustrating a method for crowd-funding a cinema selection or proposed cinema selection according to an embodiment.

Figure 1B:
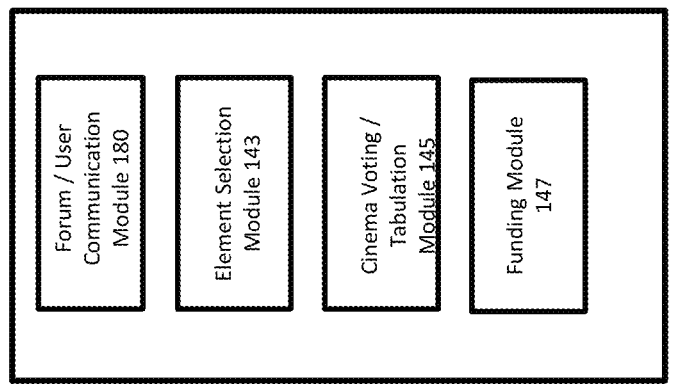
FIG. 1B illustrates a logical structure of a cinema creation selection application.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

An embodiment is now described with reference to the Figures, where like reference numbers indicate identical or functionally similar elements.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

As used herein, a "cloud" is used in an art-recognized manner and can refer to a collection of centrally managed resources such as networked hardware and/or software systems and combinations thereof provided and maintained by an entity, wherein the collection of resources can be accessed by a user via wired or wireless access to a network that may be public or private, such as, for example, a global network such as the Internet. Such centralized management and provisioning of resources can provide for dynamic and on-demand provisioning of computing and/or storage to match the needs of a particular application. The cloud may include a plurality of servers, general or special purpose computers, as well as other hardware such as storage devices. The resources can include data storage services, database services, application hosting services, word processing services, payment remitting services, and many other information technological services that are conventionally associated with personal computers or local and remote servers. Moreover, in one aspect, the resources can be maintained within any number of distributed servers and/or devices as discussed in more detail below. Thus, the present disclosure discusses a system that may perform data storage and application hosting operations within a cloud computing environment in order for a user to manage his/her personal information from a central online location.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers or computing devices referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

As described herein, a "user" or a "creator" "film creator" refer to individuals that are creating, viewing or voting on a proposed cinema or film selection. As described herein, "constructing," "creating," and/or "selecting" may be referring to the same or different steps in the putting together or creation of the proposed cinema selection.

As described herein, an "indicator" or "value" or "numeral" may provide a representation of a popularity or number of times a certain item has been selected. For example, a voting value may be representative of a number of times a proposed cinema selection has been voted for by users. In another example, a polling value may be representative of a number of users that have selected certain cinema elements to be include in proposed cinema selections.

In addition, as described herein, "user devices," "portable devices," "computing devices," and "creator devices" refer to computing devices that may correspond to desktop computers, cellular or smart phones, personal digital assistants (PDAs), laptop computers, tablet devices, and/or IP television that can provide network connections and/or processing resources to allow a user to communicate with a system or server or computing device over a network.

Methods and processes described herein may be performed utilizing a computer program, or as a computer-implemented method. The computer program may be implemented through the use of code or computer-executable instructions. There instructions may be stored in one or more memory resources of the computing device.

Embodiments described herein may be implemented using software or programming engines, components, and/or modules. Software engines, components, or modules may include a program, sub-routine, portion of a program, or a software component or hardware component capable of performing one or more stated tasks or functions. Modules or components, implemented in hardware or software, may exist independently of other modules or components, or alternatively, modules or components may be a shared element or process with other modules, components or machines.

The embodiments described herein may be implemented by use of computer-readable instructions that are executable by one or more processors (or processing devices) after being read from a computer-readable medium. Methods shown or described with figures below provide examples of processing resources and computer-readable mediums which instructions for implementing the processes or embodiments can be carried on and then executed. Computers, terminals, network enabled devices (e.g., mobile devices, tablets, network computers) are examples of machines and devices that utilize processors, memory, and instructions stored on computer-readable mediums. Additionally, computer programs or a computer usable carrier medium may execute instructions.

FIG. 1A is an illustration of a system including a computing device 100, a network 170, and a cinema selection creation system 160. The computing device 100 may comprise a processor 110, input device(s) 120, output device(s) 130, and a memory 140. In an embodiment, the computing device 100 may comprise a communication module 150 comprising transceivers, connectors, and/or interfaces.

The system may be implemented on one or more computing devices, such as one more servers or other mobile computing devices and may also be implemented through other computer systems utilizing alternative architectures (e.g., peer-to-peer technology and network). The software code and/or instructions, executable by one or more processors, to implement processes, methods, or algorithms of the invention may be resident in memory of a computing device 100, a mobile device, a server, or any combination thereof, depending on the requirements and capabilities of the devices utilized by users. In embodiments, one mobile device in a network may have most of the code and/or instructions stored thereon, and at the same time, another mobile device on the same network or another network, may login to the system of the invention and the software code and/or instructions, may be stored in a memory of the server. In an embodiment, the server or other storage may be located in a cloud computing environment, where a certain amount of storage is provisioned for the below-described system.

The system may utilize data provided by the cinema selection creation system 160, data provided by the computing device 100 and information provided by a user for the user to create and/or select proposed cinema items or selections. In an embodiment, user interface features may be specific to a location in which the computing device is located and the system may also adjust user interface features based on other user selections. For example, the user interface for the system may be different depending on the device utilized to login to the cinema selection creation system. In an embodiment, the content displayed may be different depending on the device utilized or when a user logs into the cinema selection creation system 160.

The computing device 100 may include a cinema creation selection application which may be managed or implemented utilizing an application manager 151. The computing device may also include a cinema database 153, a user interface component or module 155. In an embodiment, the cinema creation selection application may correspond to a program that is downloaded onto a smartphone, portable computing device (e.g., tablet, network computing device) from a memory card, other portable storage device or application store. The user may register the computing device 100 and/or user as users of the cinema creation selection system 160. In an embodiment, the cinema creation selection application may not be fully downloaded onto the computing device and a user may instead input a web address or hyperlink and utilize an existing browser on the computing device to log into the cinema creation selection application manager 160 over the network 170. Descriptions provided herein may be equally applicable to both configurations (and other similar hybrid configurations) described above. In an embodiment, the cinema creation selection application or the corresponding module in the cinema creation selection system 160 may be located in a server in a cloud computing environment.

The application manager 151 may handle communications exchanged via the network 170 between the cinema creation selection application and the cinema creation selection system 160. The application manager 151 may, for example, utilize the communication device or interface 150 to communicate over the network 170. The communication device or interface 150 may receive and/or send network communications over a cellular data/voice interface and/or a wireless network interface (IEEE 802.11(g) or 801.22(n) or other type of wireless interfaces. In an embodiment, the communication may take place over a wired network interface.

The application manager 151 may receive user input and other information) to select data or content that is provided by the user interface (UI) component 155. In an illustrative embodiment, for example, the UI component may cause various user interface features to be output to a display device 144 of the computing device 100. The UI component 155 may also provide dynamically adjusted content based on user selections provided via user input.

In an embodiment, the UI component 155 may utilize a UI framework that can be configured with various content, such as UI content supplied by the cinema creation selection system 160 as a result of user input. In an embodiment, the cinema selection database 153 may provide content to users that is stored regarding cinema elements selected by users and/or proposed cinema concepts voted on by users.

In an embodiment, if the application manager is executed and operating, the UI component 155 may render various user interfaces and/or UI screens, as are illustrated and discussed later in the application, to the user to request information from the user or to display information received from the cinema creation selection system 160. The UI component 155 may render user interfaces such as home page, initial page, launch page, registration page, element selection page, or any combination thereof, as well as other screens or web pages described herein.

In an embodiment, the processor 110 may process data signals and may comprise various computing architectures including a complex instruction set computer (CISC) architecture, a reduced instruction set computer (RISC) architecture, or an architecture implementing a combination of instruction sets. Although only a single processor is shown in FIG. 1A, multiple processors may be included. In an embodiment, the processor 110 may comprises an arithmetic logic unit, a microprocessor, a general purpose computer, or some other information appliance equipped to transmit, receive and process electronic data signals from the memory 140, input device(s) 120, output device(s) 130 and/or the communication module 150.

In an embodiment, input device(s) 120 may be any device configured to provide user input to the computing device 100, such as a cursor controller or a keyboard. In an embodiment, an input device 120 may include an alphanumeric input device, such as a QWERTY keyboard, a key pad or representations of such created on a touch screen, adapted to communicate information and/or command selections to processor 110 or memory 140. In another embodiment, an input device 120 is a user input device equipped to communicate positional data as well as command selections to processor 110 such as a joystick, a mouse, a trackball, a stylus, a pen, a touch screen, cursor direction keys or other mechanisms to cause movement adjustment of an image. In embodiments, multiple input devices 120 may be utilized in a computing device 100, such as a touch screen, joystick, trackball, pen, and/or keyboard.

In an embodiment, output devices 130 may represents any device equipped to display electronic images and data as described herein. Output device 130 may be, for example, an organic light emitting diode display (OLED), liquid crystal display (LCD), cathode ray tube (CRT) display, or any other similarly equipped display device, screen or monitor. In one embodiment, output devices 130 may be equipped with a touch screen in which a touch-sensitive, transparent panel covers the screen of output devices 130.

In an embodiment, the memory 140 may store instructions and/or data that may be executed by processor 110. The instructions and/or data may comprise code for performing any and/or all of the techniques described herein. In an embodiment, memory 140 may be a dynamic random access memory (DRAM) device, a static random access memory (SRAM) device, Flash RAM or other non-volatile storage device, combinations of the above, or some other memory device known in the art. In an embodiment, the memory 140 may comprise an application manger 151, a cinema database 155 and an UI component 155. In an embodiment, the cinema creation selection application may include an element selection module 143, a cinema voting module 145 and/or a funding or payment module 147. FIG. 1B illustrates a logical structure of a cinema creation selection application. In an embodiment, the memory 140, and modules comprised therein, may communicate or be configured to communicate with the processor 110, input device(s) 120, output device(s) 130, and/or the communication module 150.

Figure 2:
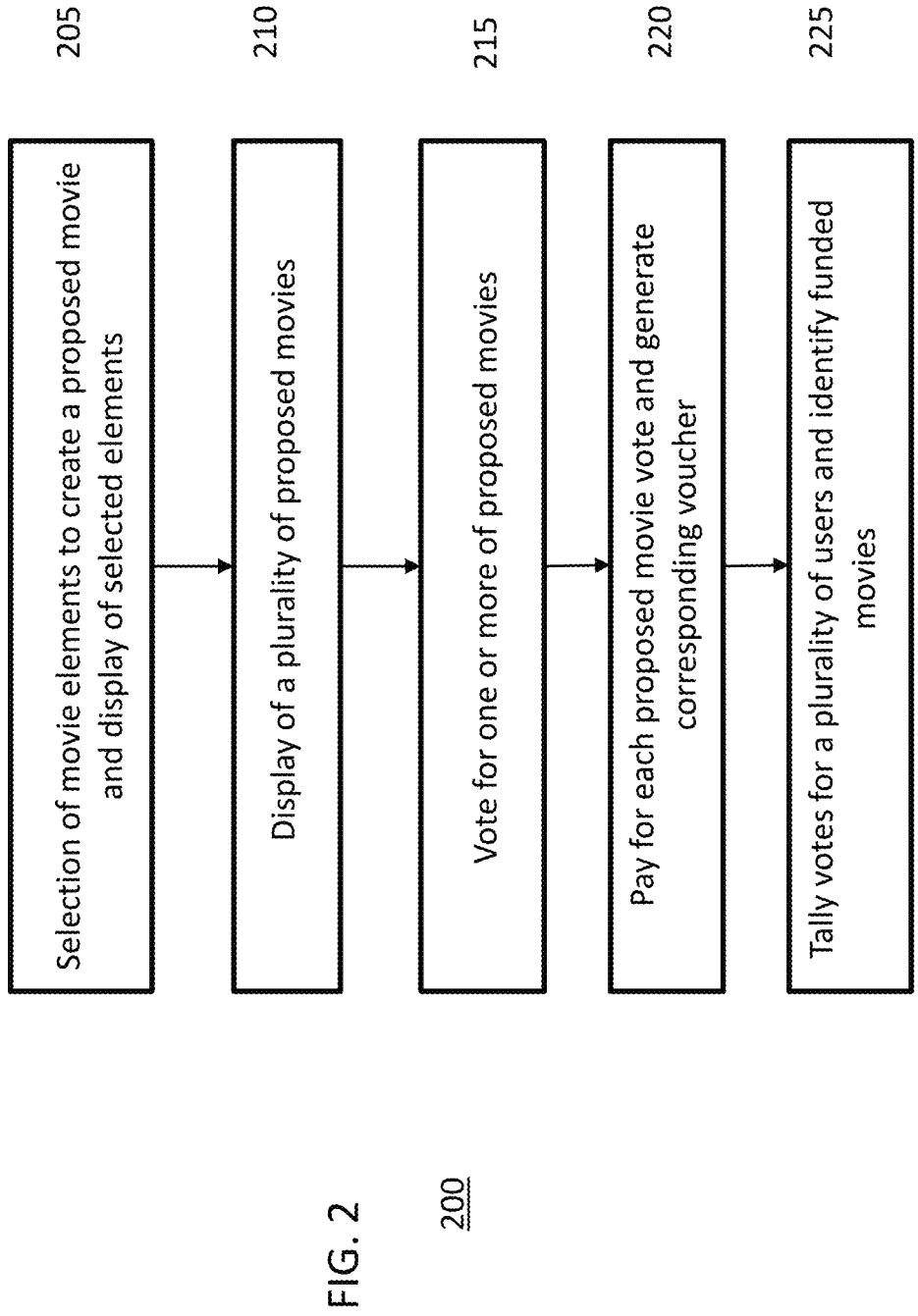
FIG. 2 is a flowchart illustrating a method for crowd-funding a cinema selection or proposed cinema selection according to an embodiment.

FIG. 2 is a flowchart illustrating a method for crowdfunding a cinema selection or proposed cinema selection according to an embodiment. In an embodiment, the steps of the method 200 may be implemented for example utilizing components described within the embodiments of FIGS. 1A and 1 B. Those of skill in the art will recognize that one or more of the methods may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 2 in different orders. Moreover, other embodiments can include different and/or additional steps than the ones described here. References to components or elements of FIGS. 1A and 1B are for purposes of illustrating a suitable element or component for performing a step or sub-step.

In an embodiment, the element selection module 143 in the cinema creation selection application and/or its counterpart module in the cinema creation selection system 160 may utilize the application manager 151 and the UI component 155 to present, receive selections of and/or select cinema elements to create a proposed cinema selection (or film) (step 205). As described below, a number of cinema elements and cinema elements sub-elements may be selected and a proposed cinema selection may be created identifying the setting, director, musical director, theme, tone, and other cinema elements. This proposed cinema selection and one or more of the selected elements may be displayed on what is referred to as a one page, which is a summary page of a user's proposed cinema selection.

In an embodiment, the cinema tabulation voting module 145 in the cinema creation application and/or its counterpart module in the cinema creation selection system 160 may utilize the application manager 151 and the UI component 155 to retrieve and/or display a plurality of proposed cinema/movie selections (step 210). The proposed cinema/movie selections may sort and/or display the proposed cinema/movie selections in a ranked order, an unranked order, a polled order, or an order based on a selected cinema element. In an embodiment, the proposed cinema/movie selections may be displayed automatically and/or based on user input.

In an embodiment, the funding module 147 in the cinema creation application and/or its counterpart module in the cinema creation selection system 160 may utilize the application manager 151 and UI component 155 to provide payment instructions, receive payment information, transmit payment information to necessary third parties and/to confirm receipt of payment (step 220). In an embodiment, the funding module 147 in the cinema creation application and/or its counterpart module in the cinema creation selection system 160 may generate a corresponding voucher for each vote submitted by the user and provide the voucher to a user via an electronic or paper delivery system. For example, the voucher may be provided via text message, email message, overnight mail and/or the U.S. Postal Service.

In an embodiment, the cinema tabulation voting module 145 in the cinema creation application and/or its counterpart module in the cinema selection system 160 may utilize the application manager 151 and UI component to receive and tabulate votes from users who have paid for proposed cinema selections (step 225). After a threshold funding level has been reached which may allow the greenlighting of the movie, the cinema tabulation voting module 145 and/or its counterpart module in the cinema selection system 160 may identify the proposed cinema selection that has equaled or exceeded the funding threshold as the proposed cinema selection to be produced and/or created. In an embodiment, this cinema selection may or may not be the highest ranked proposed cinema selection. For example, an adventure proposed cinema selection may have an overall budget of $75 million and may have received votes where the users have paid $40 million. In this illustrative example, a romantic comedy proposed cinema selection may have a budget of $25 million and may have received votes where the users have paid $25 million. In this embodiment, the cinema tabulation voting module 145 in the cinema creation application and/or its counterpart module in the cinema selection system 160 may identify that the romantic comedy proposed cinema selection may be greenlit because it has exceeded the funding threshold. In this embodiment, in terms of pure voting, the adventure proposed cinema selection may be the highest ranked proposed cinema selection but may not have enough votes and/or funding to be greenlit. In an embodiment, the cinema tabulation voting module 145 in the application and/or its counterpart module in the cinema selection system 160 may send notifications to all voters that have voted for the identified proposed cinema selection as the movie or title to be produced. In an embodiment, the cinema tabulation voting module 145 in the cinema creation application and/or its counterpart module in the cinema selection system 160 may utilize the application manager 151 and UI component 155 to generate and display lists or information, automatically or based on user input, identifying, for example, 1) all proposed cinema selections including a certain actor or direction; 2) the top ten proposed cinema selections in terms of voting; 3) proposed cinema selections closest to a user's proposed cinema selection; and 4) proposed cinema selections proposed by one or more users.

In an embodiment, the cinema selection and construction system 160 may also have an initial development threshold funding level. For example, the initial development funding threshold may be a funding threshold, which if met, results in the system generating a development and/or production plan and development and/or production budget. The generating of such a plan and/or budget is a next step after proposing a cinema selection and having a number of other users and/or voters expressing an interest in the proposed cinema selection. The system may generated this and users of the system may see this as interest in the proposed cinema selection, which may result in more votes (and therefore funding) for the proposed cinema selection. In an embodiment, the cinema tabulation voting module 145 and/or its counterpart module in the cinema selection system 160 may identify a proposed cinema selection that has equaled or exceeded the initial development funding threshold as the proposed cinema selection and may generate a development and/or production plan and/or budget. Alternatively, the cinema tabulation module 145 may send an instruction and/or signal to another module on the mobile device and/or server to generate the development and/or production plan and/or budget.

For example, a romantic comedy may have an initial development funding threshold of $1 million in funding from a number of votes. In this illustrative example, once $1 million of funding has been supplied by the users via voting and funding, the cinema construction and selection system 160 (e.g., the cinema tabulation module or other modules on the computing device or server) may generate a development and/or production plan and/or budget or cause a development and/or production plan to be generated. In an embodiment, the cinema tabulation voting module 145 in the application and/or its counterpart module in the cinema selection system 160 may also send notifications to all voters that have voted for the identified proposed cinema selection that the development and/or production plan is being generated.

Figure 3A:
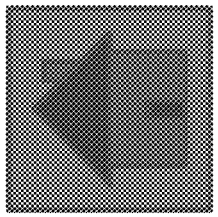
FIG. 3A illustrates an example of a user interface to receive user input identifying a movie genre.

As discussed above, the element selection module 143 of the cinema creation selection application in conjunction with a corresponding module in the cinema creation selection system 160 may present input screens or web pages on display devices 144 to enable selection of cinema elements and construction of proposed cinema selections. FIGS. 3A-3E illustrate examples of user interfaces that may be displayed to a user to enable the user to select cinema elements and create a proposed cinema selection. FIG. 3A illustrates an example of a user interface to receive user input identifying a movie genre. In an embodiment, the element selection module 143 may receive genre options such as mystery, horror, thriller, musical, romance, family, western, drama, action, adventure, comedy, science fiction (sci fi), fantasy, and/or epic genres. In an embodiment, the element selection module 143 of the cinema creation selection application in conjunction with its corresponding module in the cinema creation selection system 160 may additional receive as input thriller genre sub-options comprising action thriller, political thriller, film noir thriller, horror thriller, paranoid thriller, crime thriller, spy thriller, psychological thriller, escape thriller, fantasy thriller, sports thriller, sci fi thriller, horror thriller, mystery thriller, mind bending thriller, and/or post-apocalypse thriller.

FIG. 3B illustrates an example of a user interface to receive user input identifying or selecting a film creative team. In an embodiment, the element selection module 143 of the cinema creation selection application in conjunction with the corresponding module in the cinema creation selection system 160 may receive as input creative team options comprising director, male lead, female lead, co-stars, production designer, and musical (score) director.

FIG. 3C illustrates an example of a user interface to receive input identifying a film's theme. In an embodiment, the element selection module 143 of the cinema creation selection application in conjunction with the corresponding module in the cinema creation selection system may receive as input theme options comprising gaining/losing power, change vs. tradition, ends do or don't justify means, chaos and order, revenge, redemption, circle of life, darkness and light, freedom vs. oppression, discrimination, fate or free will, class system vs. equality, conquering fear, sacrifice, man vs. nature, materialism as downfall, idealism vs. corruption, self-awareness, man vs. technology, temptation, willpower vs. struggle, and/or standing up for yourself.

FIG. 3D illustrates an example of a user interface to receive input identifying a film's tone. In an embodiment, the element selection module 143 of the cinema selection application in conjunction with the corresponding module in the cinema creation selection system may receive as input cinema tone options such as tongue and cheek, soulful, deep/introspective, joyful, dark/melancholy, whimsical, quirky, campy, serious, intense, playful/light, bitter, tragic, and scary.

FIG. 3E illustrates an example of a user interface to receive input identifying a film's setting. In an embodiment, the element selection module 143 of the cinema selection application in conjunction with the corresponding module in the cinema creation selection system may receive as input cinema setting options such as a time period, a time of year, a location and an arena. In an embodiment, the element selection module 143 of the cinema selection application in conjunction with the corresponding module in the cinema creation selection system 160 may receive as input arena elements such as life in the country, life of the common man, world of science and technology, world of genius, disaster, journey/on the road, world of super powers, war time, exploration, career in the big city, the world of performers/artist, the rich and powerful, the weird and strange fringes of society, and/or holiday oriented.

FIG. 3F illustrates an example of a user interface to receive input identifying a film type. In an embodiment, the element selection module 143 of the cinema selection application in conjunction with the corresponding module in the cinema creation selection system may receive as input film type elements such as comprising live action (real life people), computer animation (or CGI), traditional animation, puppets, and/or clay animation.

FIG. 3G illustrates an example of a user interface to receive input identifying script elements. In an embodiment, the element selection module 143 of the cinema selection application in conjunction with the corresponding module in the cinema creation selection system 160 may receive as input script elements such as words, phrases, paragraphs, stories, synopsis, treatments, etc. identifying words that should be included within the movie script.

FIG. 3H illustrates an example of a user interface to receive input identifying locations of a proposed film. In an embodiment, the element selection module 143 of the cinema selection application in conjunction with the corresponding module in the cinema creation selection system may receive as input locations such as cities, parks, national parks, buildings, streets, and/or any combination thereof. In embodiments, there may be multiple locations that may be selected via the user interface. In an embodiment, the element selection module 143 may receive as input script element selections from a user.

FIGS. 4A-4L illustrate examples of user interfaces to receive input identifying further definitions or selections of sub-genres and/or subcategories. FIG. 4A illustrates an example of a user interface to receive as input selections of drama subcategories; FIG. 4B illustrates an example of a user interface to receive as input selections of action subcategories, FIG. 4C illustrates an example of a user interface to receive as input selections of adventure subcategories; FIG. 4D illustrates an example of a user interface to receive as input selections of comedy subcategories, FIG. 4E illustrates an example of a user interface to receive as input selections of science fiction subcategories, FIG. 4F illustrates an example of a user interface to receive as input selections of fantasy subcategories, FIG. 4G illustrates an example of a user interface to receive as input selections of musical subcategories, FIG. 4H illustrates an example of a user interface to receive as input selections of romance subcategories, FIG. 4I illustrates an example of a user interface to receive as input selections of family subcategories, FIG. 4J illustrates an example of a user interface to receive as input selection of western subcategories, FIG. 4K illustrates an example of a user interface to receive as input selections of horror subcategories, FIG. 4L illustrates an example of a user interface to receive as input selections of mystery subcategories, and FIG. 4M illustrates an example of a user interface to receive as input selections of epic subcategories.

In an embodiment, as described above, the element selection module 143 of the cinema creation selection application in conjunction with the corresponding module in the cinema creation selection system 160 may receive as input a plurality of above-identified elements utilizing the user interface described above. The cinema creation selection application and/or the corresponding module in the cinema creation selection system receives user inputs and generates a database record including a plurality of fields for each user. In an embodiment, the database record may be stored in the computing device 100. In an embodiment, the database record may be stored in the cinema creation selection system 160, or alternatively, in a cloud computing environment. In an illustrative embodiment, there may be 10, 17 or 25 cinema creation elements that may be selected and input into the cinema creation selection application. In an embodiment, each database record includes a field corresponding to each of the cinema creation elements. In an embodiment, a user's database record may not have values in all of the fields. The number of cinema creation elements may be constantly changing with new and/or edited cinema creation elements being added to the current cinema creation elements that are present in the cinema creation or construction selection application.

In an embodiment, the cinema tabulation voting module 145 in the cinema creation selection application in conjunction with the corresponding module in the cinema creation selection system 160 may receive the selected cinema elements from the element selection module 143, and then generate and display a web page or electronic document including at least one of the selected elements. FIG. 5 illustrates an illustrative one page for a proposed cinema selection with selected cinema elements according to an embodiment. For example, FIG. 5 illustrates an example of a user interface, e.g., a sample web page, for displaying a user or creator's selected elements, which may be referred to as a "one page." As is shown in the illustrative embodiment of FIG. 5, the user selected a live-action R rated sci fi action with leads Harrison Ford and Miranda Cosgrove and Benedict Cumberbatch and Sam Rockwell, directed by Paul Verhoeven, and also including a musical score created by John Scott. The proposed cinema selection may have Richard Hudolin as the production designer, a proposed theme of conquering fear, and a proposed tone of playful/light.

In an embodiment, the cinema creation selection system 100 may not require a user or creator to pay an entry fee to create a proposed cinema selection and only charge if the user or creator would like to vote for a proposed cinema selection (either the creator's or another third party's proposed cinema selection). In an alternative embodiment, the proposed movie creation may require each creator or user to pay an entry fee to create a proposed cinema selection. In an embodiment, the entry fee may or may not be included in the funding for the proposed cinema or film selection. In an embodiment, the cinema tabulation voting module 145 of the cinema creation selection application in conjunction with the corresponding module in the cinema creation selection system 160 may generate a ticket voucher for whichever proposed movie is ultimately selected by the crowd-funded cinema computing platform.

As discussed, multiple users may input proposed cinema selections into the element selection module 143 of the cinema creation selection application and the corresponding module in the cinema creation selection system 160 and the cinema database 153 may be populated with a plurality of records corresponding to the proposed cinema selections.

In an embodiment, the cinema tabulation voting module 145 of the cinema creation selection application and/or the corresponding module in the cinema creation selection system 160 may generate a list of a plurality of proposed cinema selections along with representative selected elements. In an embodiment, the cinema tabulation voting module 145 of the cinema creation selection application and/or the corresponding module in the cinema creation selection system 160 may sort and/or rank the list of all proposed cinema selections. FIG. 6 illustrates an example of a user interface displaying a list of ranked proposed cinema selections according to an embodiment. In this illustrative embodiment, the list may include a ranking number, a brief description of the proposed cinema selections and a percentage of votes received by the proposed cinema selections. This list may be based on ranking of proposed cinema selections, which means that users have voted for the listed cinema selections.

In an embodiment, the cinema tabulation voting module 145 of the cinema creation/construction selection application and/or the corresponding module in the cinema creation/construction selection system 160 may create a second record for each proposed cinema selection. In an embodiment, the second record in the cinema database 153 may be an additional field in the already existing database record generated for the proposed cinema selection. In another embodiment, a separate database record may be generated or created in the cinema database 153 for each proposed cinema selection to separate the creation of the proposed movie selection from the voting for the proposed movie selections. In this embodiment, greater security may be provided against voter fraud by separating, in some cases even on separate servers and/or computing devices, on separate networks in separate locations, proposed cinema selection records from proposed cinema selection voting records.

In an embodiment, if a user would like to vote for a cinema selection, the payment module 147 of the cinema creation selection application and/or the corresponding module in the cinema creation selection system 160 may accept payment and payment information from the user. Initially, the cinema tabulation voting module 145 of the cinema creation selection application and/or the corresponding module in the cinema creation selection system 160, may receive input identifying that a user may want to vote for a proposed cinema selection. In an embodiment, the cinema tabulation voting module 145 or the payment module 147 of the cinema creation selection application and/or the corresponding module(s) in the cinema creation selection system 160 may generate a user interface screen providing information regarding the voting process and the cost of voting verifying that the user would like to vote for the proposed cinema selection. FIG. 7 illustrates an example of a user input screen identifying a process for voting, the rules of voting, and a cost of voting.

In an embodiment, the payment module 147 of the cinema creation selection application and/or the corresponding module in the cinema creation selection system 160 may receive input identifying the payment method selected by the user. In an embodiment, the payment module 147 of the cinema creation selection application and/or the corresponding module in the cinema creation selection system 160 may keep a tally of all payments made by users. In an embodiment, the payment module 147 of the cinema creation selection application and/or the corresponding module in the cinema creation selection system 160, may have a greenlight threshold, which is a threshold funding amount that is enough to fund and produce a proposed cinema selection. Once the payment module 147 of the cinema creation selection application and/or the corresponding module in the cinema creation selection system 160 meets a threshold funding amount, the payment module 147 may transmit a notification to the cinema creation or construction selection system 160 that the funding threshold has been met. The crowdfunded donated money may then be utilized for production and distribution of the selected or greenlit cinema selection. In an embodiment, the greenlight threshold may be set by the user creating the cinema selection. Alternatively, in an embodiment, the greenlight threshold may be set by a director or third-party after reviewing the selected elements for the cinema selection. In an embodiment, the payment module 147 of the cinema creation selection application and/or the corresponding module in the cinema creation selection system 160, each time payment is received and/or verified by a third party, may generate a film voucher for every user that paid money to create and/or vote on a cinema selection. The payment module 147 of the cinema creation selection application and/or the corresponding module in the cinema creation selection system 160 may then generate instructions to have the film voucher sent to the user either via email, text, regular mail or other document delivery methods.

Referring back to the cinema tabulation voting module 145 of the cinema creation selection application and/or the corresponding module in the cinema creation selection system 160, the payment module 147 of the cinema creation selection application and/or the corresponding module in the cinema creation selection system 160 may transmit a notification or verification to the cinema tabulation voting module 145 that payment has been made and that the user is able to vote for a cinema selection. In embodiments of the invention, a user can vote multiple times, but must pay for each vote. Each vote may cost the same amount and the user receives an additional voucher.

The cinema tabulation voting module 145 of the cinema creation selection application and/or the corresponding module in the cinema creation selection system 160 may analyze the selected elements in the proposed cinema selections. The cinema tabulation voting module 145 may automatically analyze records in the cinema database 153 to generate a variety of recommendations and information for system users.

In an embodiment, as the votes for cinema selections are being received, the cinema tabulation selection module 145 of the cinema creation selection application and/or the corresponding module in the cinema creation selection system 160 may begin to rank the proposed cinema selections. In an embodiment, the cinema tabulation selection module 145 of the cinema creation selection system application and corresponding module of the cinema creation selection system may generate a display screen with the most popular cinema selections. FIG. 6 illustrates an example of a user interface to display a voter ranking of proposed cinema selections according to an embodiment. In FIG. 6, a percentage of votes may be identified for each cinema selection, e.g., 43% or 20%. In this illustrative embodiment, if a proposed cinema selection is selected, a one page user interface screen may be displayed. In an embodiment, in this context, "ranking" may refer to placement of proposed cinema selections or specified cinema elements based on user or creator's votes. In other words, "ranking" may be utilized by the cinema tabulation voting module 145 and/or a corresponding module in the cinema creation selection system 160 to identify proposed cinema selections or cinema elements that have a largest amount of votes. In an embodiment, the top ranked concept may be produced when it reaches the funding threshold. In an alternative embodiment, a lower ranked proposed cinema selection may be produced or greenlit when it meets its funding threshold, although other proposed cinema selections may have a higher ranking (e.g., number of votes). In an embodiment, the one page may include a percentage of votes that the proposed cinema selection has received, e.g., in the user interface screen of FIG. 6, the percentage may be displayed in the right hand corner. FIG. 8 illustrates an example of a user interface that displays a one-page with a percentage of votes according to an embodiment of the invention. In the illustrated embodiment of FIG. 8, a user can vote for this cinema selection directly from the one-page and thus interact with the cinema tabulation voting module 145 of the cinema creation selection application and/or the corresponding module in the cinema creation selection system 160.

In an embodiment, the cinema tabulation voting module 145 may also analyze records in the cinema database 153 to allow users to make better informed decisions and rank or present a variety of the cinema selections.

In an embodiment, "polling" may refer to identifying cinema elements that are most popular for users that have created proposed cinema selections. "Polling" may refer to popular items, but does not refer to what proposed cinema selections that people may have voted for. "Polling" information may be utilized by users or creators of the cinema creation selection system 160 to identify similar proposed cinema selections and/or cinema elements that may be trending higher than other cinema elements. However, "polling is not referring to cinema elements that may have a highest number of votes. For example, users may want to know the most utilized script elements and/or words in the proposed cinema selections. In an illustrative embodiment, a user may request from the cinema creation selection system 160 the most utilized words in cinema element selections. FIG. 9 illustrates an example of a user interface screen to display a polling of the top ten words in the cinema element selections in the crowd-funded cinema selection system 160.

In an embodiment, the cinema tabulation voting module 145 of the cinema creation selection application and/or the corresponding module in the cinema creation selection system 160 may also provide polling information to allow users to obtain additional information on specific cinema attributes or cinema elements of the cinema selections. The cinema tabulation voting module 145 may automatically generate or tabulate polling information without receiving requests from users. Polling information is different from ranking information in that polling is illustrating separate element trends that are recorded in all the accumulated one pages. Polling information may include information or values on elements such as male and/or female stars, directors, genres, etc. Polling may be what users or creators are considering or proposing, but polling may not be what users have voted on; instead, it is focusing on what creators have suggested in proposed cinema selections.

Figure 10A:
FIG. 10A illustrates an example of a user interface to display top ten polled stars in one pages according to an embodiment.
Figure 10E:
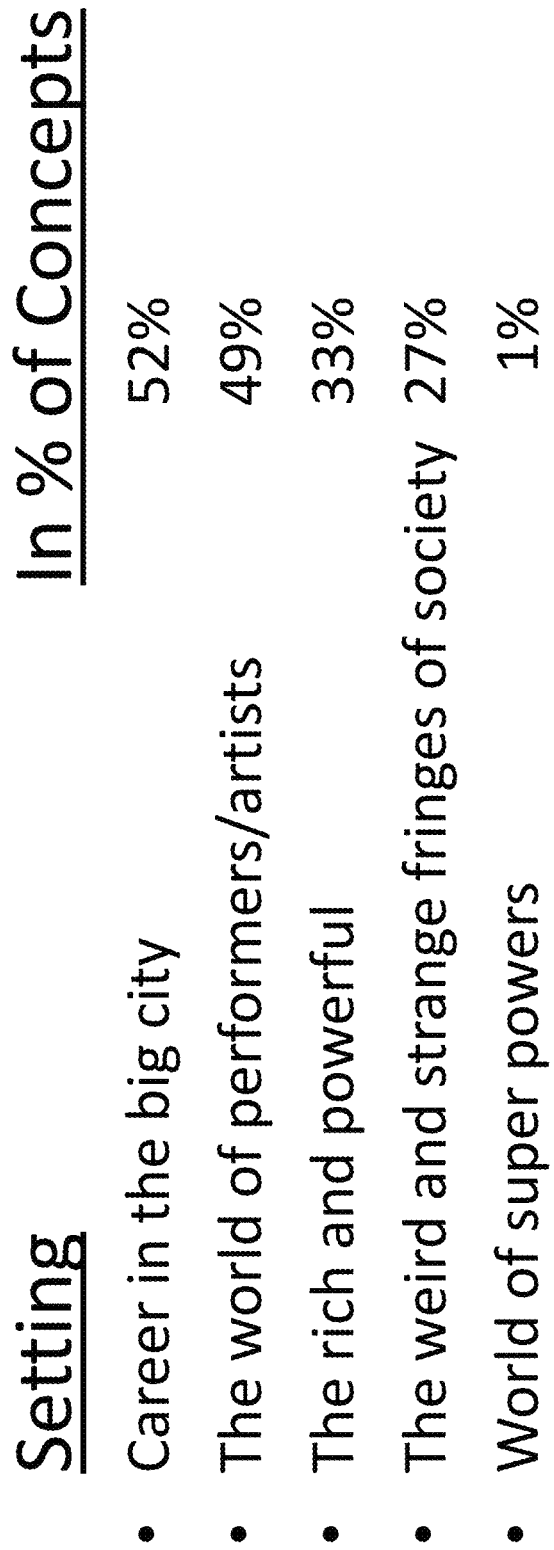
FIG. 10E illustrates an example of the user interface to display the top ten polled setting choices in one pages according to an embodiment.

For example, FIG. 10A illustrates an example of a user interface to display top ten polled stars in one pages according to an embodiment. FIG. 10B illustrates an example of a user interface to display the top ten polled directors; FIG. 10C illustrates an example of a user interface to display the top ten polled genres in one pages; FIG. 10D illustrates an example of a user interface to display the top ten polled themes in one pages; and FIG. 10E illustrates an example of the user interface to display the top ten polled setting choices in one pages according to an embodiment. The cinema creation or construction selection system and/or application is a significant improvement on existing crowdfunding sites. Previous cinema crowdfunding only allowed users to fund movies created, thought of, or constructed by others. Utilizing the present invention cinema creation selection system, creators or constructors from different geographic areas are able to utilize the Internet and computer technology to create and construct and modify proposed cinema selections. The cinema creation or construction system is a useful tool that does not exist in the field of crowdfunding of movies. In an embodiment, the cinema construction selection system automatically may analyze and/or calculate top ranked proposed cinema selections, top rated proposed cinema elements, as well as generating comparisons and providing similarity scores for different concepts. These features would not have been available without the advent and use of computers and Internet technology with the present invention cinema creation or construction system.

Figure 11A:
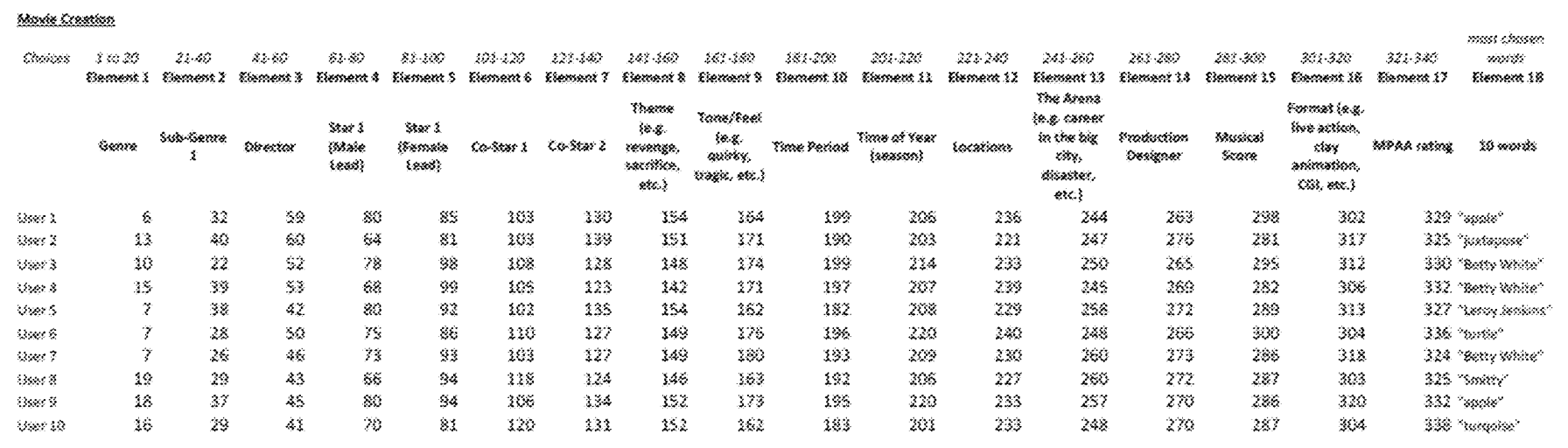

In an embodiment, the cinema tabulation voting module 145 of the cinema creation selection application and/or the corresponding module in the cinema creation selection system 160 may also provide detailed tabulation information on proposed cinema selection by users and also elements selected by users, creators, or constructors. FIG. 11A illustrates an example of a user interface to display which elements specific users and/or creators have selected for a plurality of element selections. A user or creator may utilize a user interface screen such as the user interface screen in FIG. 11A to identify what other elements users or creators are selecting with similar proposed cinema selections. In addition, the cinema tabulation voting module 145 of the cinema creation selection application and/or the corresponding module in the cinema creation selection system 160, may also automatically compare element selections of various users and identify when users and/or creators have similarities in the proposed cinema selections. In the illustrative embodiment of FIG. 11A, the cinema tabulation voting module 145 and/or the corresponding module in the cinema creation/construction selection system 160 may automatically generate a table and/or matrix similar to the matrix displayed in FIG. 11A. The FIG. 11A matrix provides an example of 10 users selecting an element value for each of the 18 movie elements (or as noted previously, more or fewer and/or different elements could be used). In FIG. 11A, the "Choices" column in the top row are quantified as one of a range of 20 numbers for simplicity. In this illustrative embodiment, the numbers represent or correspond to different genre or other element sections. For example, user 1 choosing 6 as genre may represent 6 as being a comedy film genre, whereas user 2 choosing 13 as genre may represent 13 as being a horror film genre. In alternative embodiments, there will be many more selection options as choices for each of the elements. Plus, some of the choices may appear in more than one element (i.e., be available as options in more than one element). As noted previously, the "10 words" element is 10 of the most popular (mode average) words that will be used/said in the film.

The cinema tabulation voting module 145 may notify users/creators when a certain percentage of selected elements are the same or similar (e.g., at either 20%, 50%, and/or 70% similarity) or when certain identified selected elements are similar (e.g., when the genre, sub-genre, director, male lead, female lead, and them are all the same or similar). In alternative embodiments, the similarity percentage for notification may be lower, such as around 15 percent. In this embodiment, users or creators may combine their proposed cinema selections to attempt to increase voting for the proposed cinema selections (because the vote values for the separate proposed cinema selections which have been combined to a single proposed cinema selection may be combined). In addition, the notification may result in users or creators negotiating with each other to potentially make a stronger proposed cinema selection. FIG. 11B illustrates an example of a user interface that has been generated by the cinema tabulation voting module to display similarities in proposed movie concepts/selections to help users identify which users/creators have similar ideas and may be candidates to contact. In an embodiment of the invention, as is illustrated in FIG. 11B, the cinema tabulation voting module 145 of the cinema creation selection application and/or the corresponding module in the cinema creation selection system 160, may also automatically generate a matrix that illustrates examples of the similarity score of the various users' cinema selections throughout all the categories. In an embodiment, the similarity rate may be calculated as # of matches divided by # of categories, although other formulations may be utilized. In the illustrative embodiment of FIG. 11 B, users 6 and 7 made the same choices for three (3) of the seventeen (17) elements and the system may generate a similarity score of 17.65%. In the illustrative embodiment of FIG. 11*b*, Users 1 and 5 may have the same choice for two of the 17 elements in their proposed cinema selections and the cinema tabulation voting module 145 of the cinema creation selection application and/or the corresponding module in the cinema creation selection system 160, may also generate a similarity score of 11.76% (as did users 10 as compared to either users 6 and users 9). The creation of similarity matrixes and scores is an improvement on what is occurring in the crowd-funding of movies. These are features that are unconventional steps that did not previous exist in prior movie crowdfunding systems. These new features make the creation and constructing of proposed cinema selections more efficient and more useful for creators and constructors. This is also true regarding the automatic initial development funding threshold process, funding threshold process, ranking proposed cinema selection process, and provision of polling information regarding selected cinema elements.

A forum user communication module 180 may also be a part of the cinema creation selection application and/or have a corresponding module in the cinema creation selection system 160. The forum user communication module 180 may allow users to communicate with other users who utilize the cinema creation selection system 160. The forum user communication module 180 may allow users to post messages to other users who have joined groups which the user is part of. The forum user communication module 180 may allow users to post messages to sort posts alphabetically, by most popular user generated media, by most popular proposed cinema concepts, by groups and by time of posting.

FIG. 12 is a flowchart illustrating a method 1200 for crowd-funding a cinema selection or proposed cinema selection according to an embodiment. In an embodiment, the steps of the method 1200 may be implemented for example utilizing components described within the embodiments of FIGS. 1A and 1B. Those of skill in the art will recognize that one or more of the methods may be implemented in embodiments of hardware and/or software or combinations thereof. For example, instructions for performing the described actions are embodied or stored within a computer readable medium. Furthermore, those of skill in the art will recognize that other embodiments can perform the steps of FIG. 12 in different orders. Moreover, other embodiments can include different and/or additional steps than the ones described here.

In step 1205, the cinema construction selection system may receive, from a plurality of users, selected cinema elements to create a plurality of proposed cinema selections. In other words, the users may enter cinema elements for a proposed cinema selection. In step 1210, the cinema creation selection system may store, in a memory of a computing device, the plurality of proposed cinema selections along with the corresponding selected cinema elements. In an embodiment, the proposed cinema selections may be stored in a database where each proposed cinema selection may have a separate database record.

In step 1215, the cinema construction selection system may display at least one of the plurality of proposed cinema selections along with a plurality of the selected cinema elements. The system may display all of the selected cinema elements, a subset of selected cinema elements, or may display user desired cinema elements. In step 1220, the cinema creation selection system may receive voting authorization for at least one user that a payment has been received to allow voting for one of a plurality of proposed cinema selections. In an embodiment, the user may have to pay a voting fee in order to vote for or select a proposed cinema selection. In step 1225, the cinema construction selection system may receive at least one voting value identifying which of the plurality of proposed cinema selections has been selected by the at least one user. The voting value or voting indicator may be a flag in a memory, a specific value representing that a proposed cinema selection has received a vote or that an additional field has been included in a database record.

In step 1230, the cinema creation selection system may tabulate the voting values received for proposed cinema selections. The voting or tabulating module may tabulate the votes and then update any voting indicators or values and/or update database records with voting data or information. In step 1235, the cinema construction selection system may greenlight a proposed cinema selection based on the tabulated voting value, and associated funding received associated with the tabulated voting values, have met or exceed a funding threshold. In other words, the system may compare the voting values, and associated funding, to determine if the associated funding value has exceed a funding threshold value.

In step 1240, the cinema creation selection system may display a summary listing for a proposed cinema selection, the summary listing including at least a plurality of the selected cinema elements, a voting option, and a ranking value. This may be referred to as a one-page. In step 1245, the cinema construction selection system may receive an identification of at least one selected cinema element, search a database of the plurality of proposed cinema selections and select the proposed cinema selections comprising the received selected cinema element; and display the selected proposed cinema selections comprising the received selected cinema element. The cinema construction selection system may display polling values for selected cinema elements.

In step 1250, the cinema creation selection system may notify users who created proposed cinema selections if a similarity value for the users' proposed cinema selection is greater than a predetermined threshold as compared to other proposed cinema selections; and combine, if the similarity value is greater than predetermined threshold and agreement to a combination is received, at least two proposed cinema selections cinema selections comprising the received selected cinema element. In an embodiment, the cinema construction selection system may compare selected cinema elements for each of the plurality of proposed cinema selections; generate a similarity value based on the comparison of the selected cinema elements for each of the plurality of proposed cinema selections with respect to each of remaining plurality of proposed cinema selections; and generate a similarity matrix. In other words, the cinema creation selection system may notify users with similar proposed cinema selections and combine the similar proposed cinema selections.

For the purposes of this disclosure a computer readable medium stores computer data, which data can include computer program code that is executable by a computer, in machine-readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-implemented method for cinema selection and creation, at a first computing device, the method comprising:

accessing instructions from one or more physical memory devices for execution by one or more processors;

executing instructions accessed from the one or more physical memory device on the one or more processors;

wherein executing the accessed instructions further comprising:

receiving, at the first computing device from a plurality of user computing devices over a network, selected cinema element parameters to create a plurality of proposed cinema selections, each of the plurality of proposed cinema selections and selected cinema element parameters assigned to one of the plurality of user computing devices and user associated therewith;

storing, in a memory of the first computing device, the plurality of proposed cinema selections along with the corresponding selected cinema element parameters;

displaying, on a display device of the first computing device, at least one of the plurality of proposed cinema selections along with the plurality of the selected cinema element parameters assigned to the at least one proposed cinema selections;

receiving, at the first computing device, voting authorization for at least one user that a payment has been received to allow voting for one of a plurality of proposed cinema selections, the voting authorization being received at the first computing device from a third party payment processing computing device, the payment being utilized to fund a final cinema selection that is selected from the plurality of proposed cinema selections;

transmitting a notification to at least one user computing device associated with the at least one user that the at least one user is able to vote on one of the plurality of proposed cinema selections;

receiving at least one voting value, from the at least one user computing device identifying which of the plurality of proposed cinema selections has been voted on by at least one user;

comparing, at the first computing device, selected cinema element parameters for each of the plurality of proposed cinema selections;

generating, at the first computing device, similarity values based on a comparison of the selected cinema element parameters in each of the plurality of proposed cinema selections as compared to the selected cinema element parameters for each of remaining plurality of proposed cinema selections;

transmitting a notification to the plurality of user computing devices and associated users with the generated similarity values; and generating, at the first computing device, a similarity matrix identifying the similarity values for the selected cinema element parameters in each of the plurality of proposed cinema selections as compared to the selected cinema element parameters in each of remaining plurality of proposed cinema selections.

2. The computer-implemented method of claim 1, further comprising:

aggregating or tabulating, at the first computing device, the voting values received for the plurality of proposed cinema selections; and displaying, at the first computing device, a list of the plurality of the proposed cinema selections having a highest ranking based on the voting values.

3. The computer-implemented method of claim 1, further comprising:

notifying users who created proposed cinema selections if similarity values for the selected cinema element parameters in each of the plurality of proposed cinema selections as compared to the selected cinema element parameters in each of remaining plurality of proposed cinema selections is greater than a predetermined threshold; and combining at least two proposed cinema selections into a combined proposed cinema selection, including voting values and/or the selected cinema element parameters corresponding thereto, if the similarity values are greater than the predetermined threshold and an indicator has been received identifying that the at least two proposed cinema selections can be combined.

4. The computer-implemented method of claim 1, further comprising:

aggregating or tabulating the voting values received for proposed cinema selections; and greenlighting a proposed cinema selection based on the tabulated votes associated with the plurality of proposed cinema selections and also based on a funding threshold being exceeded by payments received from users during voting for the proposed cinema selections.

5. The method of claim 1, further comprising:

receiving an identification of at least one selected cinema element parameter;

selecting proposed cinema selections including the received at least one selected cinema element parameter; and displaying the selected proposed cinema selections including the at least one received selected cinema element parameter.

6. The method of claim 5, further comprising:

displaying polling values of the selected proposed cinema selections which include the at least one received selected cinema element parameter.

7. The method of claim 1, further comprising:

displaying a voting value of a creator's proposed cinema selection compared to the plurality of proposed cinema selections based on voting values.

8. The method of claim 1, further comprising:

comparing a category of selected cinema element parameters for each of the plurality of proposed cinema selections; and displaying polled values of top items in the category of selected element parameters for the plurality of proposed cinema selections.

9. The method of claim 1, further comprising:

displaying a summary listing for a proposed cinema selection, the summary listing including a plurality of the selected cinema element parameters, a voting option, and a ranking value.

10. An apparatus, comprising:

a first computing device including one or more processors, one or more memory devices, and computer-readable instructions, the computer-readable instructions being executable by the one or more processors of the first computing device to:

receive, at the first computing device from a plurality of user computing devices over a network, selected cinema element parameters to create a plurality of proposed cinema selections, each of the plurality of proposed cinema selections and selected cinema element parameters assigned to one of the plurality of the user computing devices and user associated therewith;

store, in a memory of the first computing device, the plurality of proposed cinema selections along with the corresponding selected cinema element parameters;

display, on a display device of the first computing device, at least one of the plurality of proposed cinema selections along with the plurality of the selected cinema element parameters;

receive, at the first computing device, voting authorization for at least one user associated with the plurality of user computing devices, that a payment has been received to allow voting for one of a plurality of proposed cinema selections, the voting authorization being received at the first computing device from a third party processing computing device, the payment being utilized to fund a final cinema selection that is selected from the plurality of proposed cinema selections; and transmit a notification to at least one user computing device associated with the at least one user that the at least one user is able to vote on one of the plurality of proposed cinema selections;

receive at least one voting value, from the at least one user computing device, identifying which of the plurality of proposed cinema selections has been selected by the at least one user;

compare, at the first computing device, selected cinema element parameters for each of the plurality of proposed cinema selections;

generate, at the first computing device, similarity values based on a comparison of the selected cinema element parameters in each of the plurality of proposed cinema selections as compared to the selected cinema element parameters in each of the remaining plurality of proposed cinema selections;

transmit a notification to the plurality of user computing devices and associated users with the generated similarity values; and generate, at the first computing device, a similarity matrix identifying the similarity values for the selected cinema element parameters in each of the plurality of proposed cinema selections as compared to the selected cinema element parameters in each of the remaining plurality of proposed cinema selections.

11. The apparatus of claim 10, the computer-readable instructions of the first computing device being further executable by the one or more processors to:
aggregate the voting values received for the plurality of proposed cinema selections; and
display a list of the proposed plurality of cinema selections having a highest ranking based on the voting values.

12. The apparatus of claim 10, the computer-readable instructions of the first computing device being further executable by the one or more processors to:
notify users who created proposed cinema selections if similarity values for the selected cinema element parameters in each of the plurality of proposed cinema selections as comprised to the selected cinema element parameters in each of the remaining plurality of proposed cinema selections is greater than a predetermined threshold as compared to other of the plurality of proposed cinema selections; and
combine, if the similarity values are greater than the predetermined threshold and agreement to a combination is received, at least two proposed cinema selections into a combined proposed cinema selection, the combined propose cinema selection including voting values and/or selected cinema element parameters for the at least two proposed cinema selections.

13. The apparatus of claim 10, the computer-readable instructions of the computing device being further executable by the one or more processors to:
receive an identification of at least one selected cinema element parameter;
search a database of the plurality of proposed cinema selections and selecting the proposed cinema selections comprising the received at least one selected cinema element parameter; and
display the selected proposed cinema selections including the received at least one selected cinema element parameter.

14. The apparatus of claim 13, the computer-readable instructions of the first computing device being further executable by the one or more processors to:
display polling values of the selected proposed cinema selections comprising the received at least one selected cinema element parameter.

15. The apparatus of claim 10, the computer-readable instructions of the first computing device being further executable by the one or more processors to:
compare a category of selected cinema element parameters for each of the plurality of proposed cinema selections; and
display polled values of top items in the category of selected element parameters for the plurality of proposed cinema selections.

16. The apparatus of claim 10, the computer-readable instructions of the first computing device being further executable by the one or more processors to:
display a summary listing for a proposed cinema selection, the summary listing including a plurality of the selected cinema element parameters, a voting option, and a ranking value.

17. The apparatus of claim 10, the computer-readable instructions of the first computing device being further executable by the one or more processors to:
display a table identifying each of the plurality of proposed cinema selections and each selected cinema element parameter associated with the plurality of proposed cinema selections.

18. The apparatus of claim 10, the computer-readable instructions of the first computing device being further executable by the one or more processors to:
tabulate the voting values received for proposed cinema selections; and
greenlight a proposed cinema selection based on tabulated voting values associated with the plurality of proposed cinema selections, and if the associated funding received associated with the tabulated voting values, have met or exceed a funding threshold.

* * * * *